United States Patent [19]

Minck et al.

[11] 3,883,848

[45] May 13, 1975

[54] METHOD OF AND CIRCUIT ARRANGEMENT FOR CENTERING A CHARACTER

[75] Inventors: Konrad Minck, Hegne; Klaus Joachim, Constance, both of Germany

[73] Assignee: LICENTIA Patent-Verwaltungs GmbH, Frankfurt am Main, Germany

[22] Filed: Nov. 28, 1972

[21] Appl. No.: 310,075

[30] Foreign Application Priority Data

Nov. 30, 1971 Germany ........................... 2159307

[52] U.S. Cl. .................. 340/146.3 H; 340/146.3 J; 340/146.3 MA

[51] Int. Cl. ............................................ G06k 9/04

[58] Field of Search .......... 340/146.3 MA, 146.3 H, 340/146.3 J.146.3 R

[56] References Cited

UNITED STATES PATENTS

| | | | |
|---|---|---|---|
| 3,293,604 | 12/1966 | Klein et al. | 340/146.3 J |
| 3,587,047 | 6/1971 | Cutaia | 340/146.3 H |
| 3,613,080 | 10/1971 | Angeloni et al. | 340/146.3 MA |
| 3,613,081 | 10/1971 | Morimoto | 340/146.3 J |
| 3,673,566 | 6/1972 | Reede | 340/146.3 J |
| 3,717,848 | 2/1973 | Irvin et al. | 340/146.3 MA |

*Primary Examiner*—Gareth D. Shaw
*Assistant Examiner*—Leo H. Boudreau
*Attorney, Agent, or Firm*—Spencer & Kaye

[57] ABSTRACT

In order to recognize or produce a position of a character in a character recognition apparatus, where the position is centered with respect to the centering direction to effect character recognition, selected points of components of a character to be recognized extending transversely to the centering direction are determined and the determination is used to form centering criteria. This operation is achieved by an evaluation circuit including logic linkage circuits and elements coupling the evaluation circuit to a partial matrix field of a matrix in which the character to be recognized is resolved into raster points and through which the character passes.

9 Claims, 10 Drawing Figures

METHOD OF AND CIRCUIT ARRANGEMENT FOR CENTERING A CHARACTER

BACKGROUND OF THE INVENTION

The present invention relates to a method of and a circuit arrangement for recognizing or producing a position of a character in a character recognition apparatus. The present invention relates, more particularly, to a method of and a circuit arrangement for centering a character fed into the evaluation circuit of a character recognition apparatus in which the character to be recognized, as well as its background, are resolved into raster points and passed through a matrix formed of one or more shift registers.

The centering of a character to be recognized is known to be effected in order to bring the character into a position, in the vertical direction as well as the horizontal direction, in which it can best be recognized by the evaluation circuit, which in some form produces a sample of the character or a signal indicating the presence of the character. In character recognition apparatus of the above-mentioned type it is known to produce criteria for such a centering by interrogating points in a storage matrix in which signals representing the character are disposed. Thus it is disclosed for example, in British Patent No. 985,399 to determine in this manner the centers of blackness of a whole character with reference to its horizontal and vertical expanse and thus to produce the criteria for the horizontal and vertical centering. The drawback of such known apparatuses is that parts of the character may be missing, for example, due to a bad print, resulting in faulty centering criteria. This may lead to recognition errors.

SUMMARY OF THE INVENTION

It is an object of the present invention to provide an improvement in a method of recognizing or producing a position of a character in a character recognition apparatus which improvement permits centering of the character without significant influence from poor quality prints and particularly incomplete prints of the character.

It is another object of the present invention to provide an improvement in a character recognition apparatus useful in carrying out the method.

The objects according to the present invention are achieved in a method of recognizing or producing a position of a character in a character recognition apparatus, the position being centered with respect to a centering direction to effect character recognition, by determining selected points of components of a character to be recognized extending transversely to the centering direction and utilizing the determination to form centering criteria.

In essence, the present invention provides that selected points be determined in a component of the character, which points extend transversely to the centering direction, and that these points be used in the formation of the centering criteria.

It is proposed, in particular, that the selected points be in the centers of components of the character, i.e. points on or in the vicinity of the center line of respective components.

It is preferably provided that centering criteria of different priorities be formed with the use of the determined points and that, during the scanning of a character, the centering criterion having the highest priority be made effective for the purpose of centering the character.

It is further provided that the position of a character component transverse to the centering direction is used to form the centering criteria, the limits of this component being defined by the fact that the absence of a character element has been sensed outside these limits.

The objects of the present invention are also achieved, in a character recognition apparatus in which a character to be recognized, as well as its background, is resolved into raster points and passed through a matrix which is formed by at least one shift register and includes a partial matrix field, by the provision of an evaluation circuit which includes logic linkage circuits and which is coupled to the partial matrix field to cause selected ones of the raster points to be recognized.

In essence, the apparatus according to the present invention includes an evaluation circuit which is connected to the partial field of the matrix and which is provided with logic linkage circuits for recognizing selected raster points.

A preferred circuit arrangement, according to the present invention, is particularly distinguished by logic linkage circuits which recognize the centers of linear character components or component elements which are perpendicular to the centering direction. For this purpose it is checked whether a raster point perpendicular to the centering direction is surrounded on both sides by raster elements belonging to the lines of the character and in the centering direction by raster points belonging to the background of the character in as uniform a distribution as possible.

A further preferred circuit arrangement according to the present invention is distinguished by a memory circuit having memory cells in which a marking bit, which moves along with the displacement of the character in the centering direction, is entered, whenever a minimum number of component centers, particularly two adjacent component centers, have been recognized, which centers lie on a line perpendicular to the centering direction.

It is further provided according to an additional embodiment of the present invention, that a first memory circuit be used into which a binary ONE bit is written every time a component center has been recognized, which ONE bit is then shifted, at the matrix shifting timing rate, and a second memory circuit is provided, having the same number of memory cells as the first memory circuit, and whose input and output are connected together and within which a bit written thereinto is shifted at the matrix shifting timing rate, and that a ONE bit is written into the second memory circuit whenever a component center has been determined which is associated with the position of a ONE bit in the first memory circuit, a special feature possibly being provided in that the output and input of the first memory circuit are connected together or may be connected together.

In a still further preferred embodiment of a circuit arrangement according to the present invention, a supplemental register is provided in which the height (expanse) of a character is stored in the centering direction of the character. In this embodiment the circuit arrangement is preferably so designed that a disjunctive logic linkage of the raster points of one column or row of the matrix is used to form a sequence of black points which is fed into the supplemental register and continue circulating in the supplemental register in a fixed association with the position of the character in the matrix.

It is preferably further provided that logic linkage circuits be connected to the memory circuit and to the supplemental register where the stored component centers and/or points stored in the supplemental register are linked together and are disjunctively combined into groups to form "centered" signals of different priorities.

In another preferred embodiment, the circuit arrangement includes a switching circuit which, when a plurality of "centered" signals are fed in simultaneously, indicates the highest priority of at least one of these signals.

An additional embodiment of the circuit arrangement includes a memory for storing a succession of "centered" signals and switching means for erasing a stored "centered" signal and storing instead a "centered" signal with a higher priority when such a signal occurs.

The additional embodiment preferably includes a centering counter actuated by the shift pulses and the "centered" signals so that a "centered" signal or a subsequent "centered" signal of a higher priority causes it to take up a counter position from which it continues counting when no "centered" signals having higher priorities are present until it reaches a maximum. The counter then produces a "centered" report signal which returns it to its rest position.

DESCRIPTION OF THE PREFERRED EMODIMENTS

Figure 1:
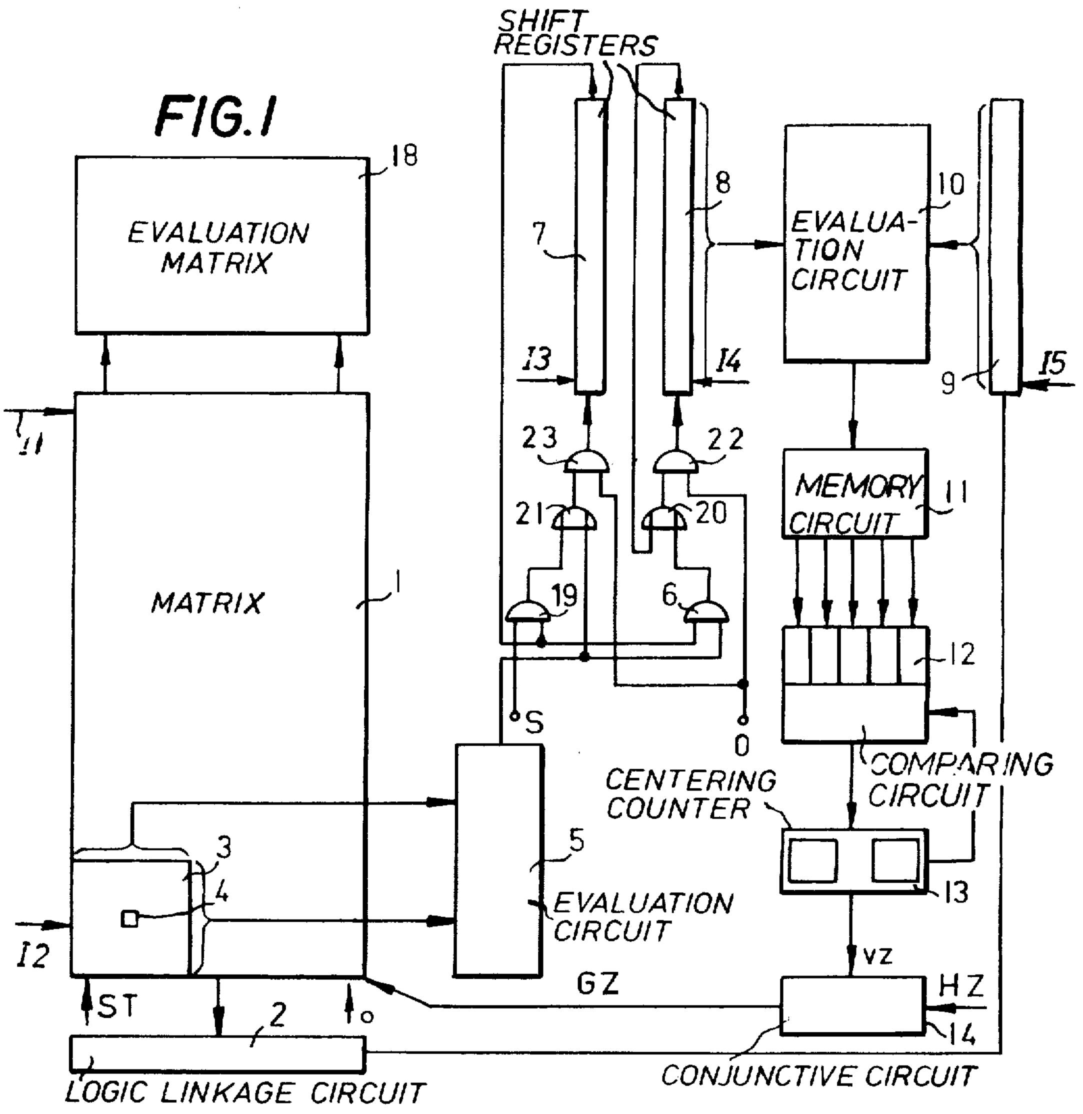
FIG. 1 is a block diagram of a portion of a character recognition apparatus showing a circuit arrangement for recognizing the centering of a character according to the present invention.

As shown in FIG. 1, a character recognition apparatus includes a matrix 1 formed by a shift register. The individual stages (memory cells) of the matrix 1 are so connected that the end of each column is connected to the input of the next succeeding column. At the lower ends of each column, disjunctive linkage circuits 2 are connected respectively to the individual stages (memory cells) of a complete row of the matrix 1; their purpose will be discussed later.

Selected ones of the individual stages (memory cells) of the matrix 1 form a partial matrix field 3 whose central stage (memory cell) 4 has a special significance. All stages (memory cells) belonging to the partial matrix field 3 are connected to an evaluation circuit 5.

Each raster point of the field of a character, which field has been resolved according to any suitable known method into raster points of the character outline and of its background, is fed via a character signal input connection I1 into the first stage (memory cell) of the matrix 1. Each raster point passes in turn through the matrix 1 in columns at a shift timing rate established by shift pulses ST fed to an advance input connection of the matrix 1. During this passage each raster point, in turn, is temporarily stored in the central stage (memory cell) 4. During this time the logic linkage circuits contained in the evaluation circuit 5 effect a comparison of this raster point with the points in its neighborhood in such a manner that a determination is made as to whether the respective raster point is a component center point of a horizontal character element or not. It is determined whether the raster point is surrounded on both its left and right by other raster points which, according to their value, belong to the outline of the character and whether the raster point is surrounded at the top and bottom and over an area extending widthwise by uniformly distributed raster points which, according to their value, do not belong to the outline of the character. Raster points meeting these requirements are indicated as component center points in the sense of points on or in the vicinity of a horizontal component center line by an output signal from the evaluation circuit 5.

Figure 2:
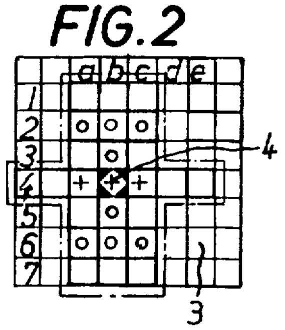
FIG. 2 is a diagrammatical representation of the partial matrix field, shown as a component of the circuit of FIG. 1.

FIG. 2 shows diagrammatically details of the partial matrix field 3 associated with an exemplary linkage. The partial matrix field 3, as illustrated in FIG. 2, includes a memory area composed of seven rows and seven columns formed by 49 stages (memory cells) represented as squares. Of these 49 stages (memory cells) only 25, i.e., approximately half, are connected to the evaluation circuit 5. The connected stages (memory cells) are outlined in dot-dash lines in FIG. 2. As an example for a component center point condition for a certain component thickness, crosses are drawn at those points where raster elements belonging to the outline of the character must be recognized and circles at those points where raster elements which do not belong to the outline of the character must be recognized.

In addition to the linkages functionally shown in FIG. 2 further linkages are employed, the detailed knowledge of which is not necessary for an understanding of the present invention. The configuration of the linkages is advisably obtained from the statistical results of experiments with which the most appropriate component center points can be determined for each of the characters sought to be recognized.

Before considering the following, it should be noted that the circuit arrangement is so designed that further processing of the component center points can be effected in a first or second mode. The first mode is advisable if the characters to be centered contain components of a longer length in a direction perpendicular to the centering direction, as this is the case, for example, for the characters standardized under the term OCR-A. The second mode is to be used when the centering is to be effected with curved lines in addition to the straight lines or by themselves, so that the path of the component center points coincides with a tangent placed on this path and perpendicular to the centering direction only for a short distance. This mode is thus suited, inter alia, for the characters of the alphanumerical system standardized under the term OCR-B. For example: Draft ISO Recommendation OCR (Optical Character Recognition).

Referring again to FIG. 1, the character recognition apparatus includes a first shift register 7 and a second shift register 8, the number of stages (memory cells) in each of the shift registers 7 and 8 corresponding to the number of rows of the character field in the matrix 1. The shift registers 7 and 8 are respectively supplied via respective advance input connectors 13 and 14, with the shift pulses ST. Thus, the shifting of signals through the matrix 1, the shift register 7 and the shift register 8 proceeds at the same rate and in synchronism.

A feedback path leads from the output of the shift register 8 via an OR gate 20 and an AND gate 22 to the input of this shift register. The second input of the OR gate 20 is connected from the output of an AND gate 6 whose first input is connected from the output of the shift register 7. The other input of the AND gate 6 is connected from the output of the evaluation circuit 5. This output is also connected to a first input of an OR gate 21 whose output is connected to the input of the shift register 7 via an AND gate 23. The other input of the OR gate 21 is cpnnected with the output of an AND gate 19, whose first input is connected from the output of the shift register 7 and whose other input is connected to a signal terminal S, through which the AND gate 19 is selectively blocked or enabled to connect the output of the shift register 7 with its input. The AND gates 22 and 23 are enabled during the component center point evaluation; only after the final "centered" indication has appeared are they temporarily blocked by the application or an erase signal 0 to the input having the same reference numeral, in order to erase the contents of the shift registers 7 and 8 by the introduction of zeros.

A component center point determined in the evaluation circuit 5 feeds a ONE bit into the shift register 7 which center bit now passes through the shift register 7 in a fixed association with the passage of a character through the matrix 1. If a ONE bit appears at the same time at the output of the shift register 7 and at the output of the evaluation circuit 5, this has the result that a ONE bit is also fed into the shift register 8 via the AND gate 6, which also passes through the shift register 8 in a fixed association with the height of the character.

If the AND gate 19 is not blocked, the last mentioned ONE bit furnishes the indication that at least two component center points were recognized on the same level in the matrix columns of the matrix 1 which need not be adjacent, which means that a horizontal component center line of a certain length has been located, as this is required for the above-mentioned first mode.

When the circuit is used for operation according to the second mode, the AND gate 19 will be blocked by the application of a blocking signal to the free input of the AND gate 19, so that the output of the shift register 7 is separated from its input. This limits the information contained in a ONE bit circulating in the shift register 8 to the fact that it signals that only two component center points originating from adjacent columns of the character and disposed at the same level. Such positions of the component center points, however, are interpreted as a curved element with a tangent which is perpendicular to the centering direction.

The character recognition circuit is provided with a supplemental register 9 which has the same number of stages (memory cells) as the shift registers 7 and 8. The supplemental shift register 9 is provided with an advance input connection 15 to which the shift timing pulses ST are supplied and a further input connection which receives a signal derived from the disjunctive linkage logic circuits 2 which receive character memory signals from one complete row of the matrix 1. This produces in the supplemental shift register 9 a series of black points which move along in step with the character in the matrix 1 and which correspond to the height of the character.

The shift register 8 and the supplemental shift register 9 are connected to logic linkage circuits forming part of an evaluation circuit designated in its entirety with the numeral 10, the evaluation circuit 10 furnishing output signals which serves as the centering criteria. It is here useful to discuss the nature of these linkage circuits which depend, as a practical matter, on the shape of the characters in the supply of characters, by means of a centering sequence which has been empirically determined in experiments.

Figure 3:
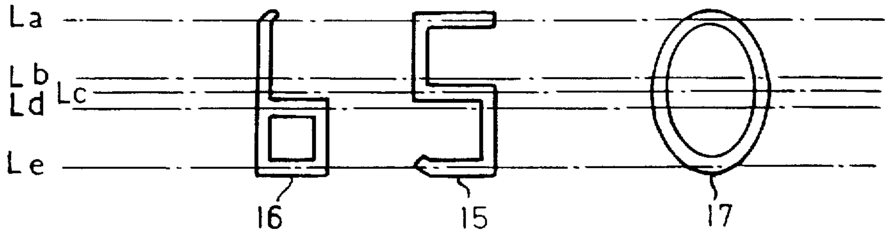
FIG. 3 is an illustration showing three examples of characters, the centering of which is to be recognized.

FIG. 3 shows, with character samples 15 and 16, how the centering criteria can be determined. Character 15, for example, has three horizontal lines. If the character is now passed through matrix 1, each individual column in matrix 1 gives an indication in the shift register 8 at which points a component center point of a horizontal component is disposed. For the character 15 in FIG. 3 such points lie on or in the vicinity of lines La, Lc and Le, so that character 15 can be aligned or centered, respectively according to the three lines La, Lc and Le. In practice, however, at least one of these lines can be ignored.

It is therefore necessary to construct the logic linkage circuits in the evaluation circuit 10 in such a way that a ONE bit is emitted if component center points of a horizontal component are detected at the corresponding locations in the shift register 8 and at least one point of the series of black points associated with the characters is determined in the supplemental register 9.

Figure 4:
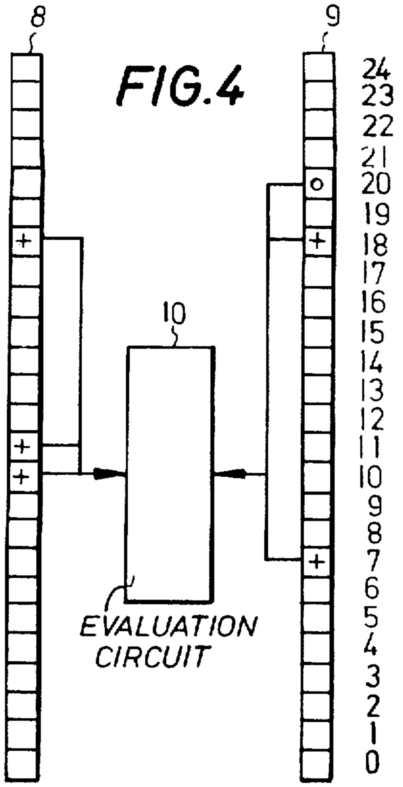
FIG. 4 is a functional diagram showing an example of a partial linkage to form a centering criterion of first priority.

FIG. 4 shows such a logic linkage circuit, as it can be used among others, for example, for centering OCR-A characters. The logic linkage circuits of the evaluation circuit 10 include connective linkages from the shift register 8 and the supplemental register 9, as shown by way of example. Crosses and circles are shown in selected ones of the squares, indicating the stages (memory cells) of the shift register 8 and the supplemental register 9. A cross indicates that a ONE bit must be stored in this particular stage (memory cell) while no ONE bit must be stored in a stage (memory cell) marked with a circle if the circuit 10 is to produce a ONE bit.

Consideration of FIG. 4 shows that horizontal component center lines La and Lc have been found since a ONE bit in the eighteenth stage (memory cell) of shift register 8 indicates that at this point a point may lie on the component center line La. This is confirmed by the information obtained about the location of the character height in the supplemental register 9. The uppermost height bit of the character must not have as yet passed into the nineteenth stage (memory cell). In the eighteenth stage (memory cell) there is thus a second point of the horizontal component center line La.

Similar conditions apply for the tenth and the eleventh stages (memory cells) of the shift register 8; the horizontal component center line Lc lies between these stages (memory cells). These facts are confirmed by the position of the height of the character which must extend at least to seventh stage (memory cell) of the supplemental register 9.

Thus, if the conditions illustrated in FIG. 4 are met there results a "centered" indication based on two located horizontal component center lines, and the evaluation circuit 10 produces an output signal.

In a corresponding manner similar linkages can be realized for other characters, such as a further character example 16. When additionally usable connective linkages are provided, it will be noted that not all connective linkages produce such an accurate centering as the first connective linkage. FIG. 5 again shows the shift register 8, the supplemental register 9 as well as the evaluation circuit 10 with the example of another connective linkage. Here it is intended to locate only a component center point on the bottom line Le of the character, as well as the minimum height (expanse) of the character above this line. There further exists the condition that the bottom of the character below line Le be limited.

An example for centering in the second mode, which involves characters having curved lines, is shown in FIG. 3, by the character 17, a zero in the OCR-B type characters. The connective linkages and logic linkage circuits which, in this case, will lead to a "centered" indication, are similar to those suited for the OCR-A characters, for example lines La and Le can be used for the illustrated character 17.

Figure 5:
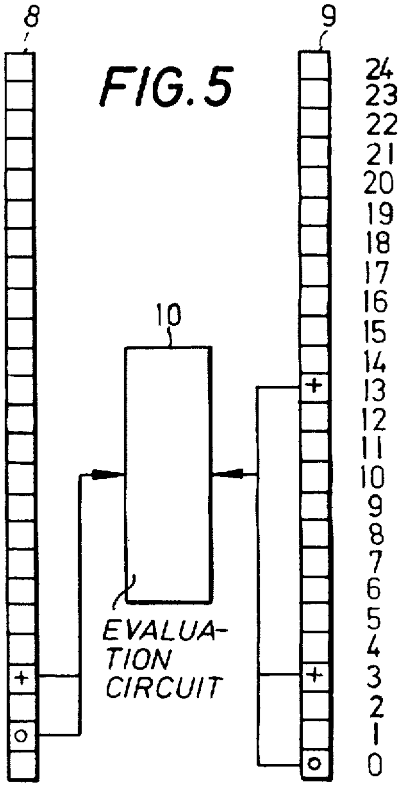
FIG. 5 is a functional diagram showing an example of a partial linkage for forming a centering criterion of the third priority.

If the example of FIG. 4 is compared with that of FIG. 5, it can be seen that in FIG. 4 two horizontal component center lines are found and in FIG. 5 only one horizontal component center line is found. Thus, depending on the number of located component center points and their position a different centering accuracy must be expected. The evaluation circuit 10 is so designed that from a plurality of possible linkage arrangements, only those are used which in a statistical centering sequence brought good results. These linkage arrangements are divided into groups and each group has its priority which corresponds to its statistical centering accuracy.

To simplify understanding, linkage arrangements of the first, third and fifth priority will now be mentioned as they can be used for vertically centering OCR-A characters. For other characters, for example for OCR-B characters which also contain curved components, all those linkage arrangements which relate to component center lines in the area of the center of the character are eliminated.

To illustrate priorities, reference is made to the table below where symbol "P" indicates component center points in the shift register 8, "S" indicates points of the sequence of black points in the supplemental register

9, V represents the OR function, a dot represents an AND function and the overhead lines represents a negated function.

On the right, the scanning lines seen in FIG. 3 are identified parenthetically. It is these lines on which or in the vicinity of which the component center points are disposed.

PRIORITY TABLE

| | | |
|---|---|---|
| First Priority | | |
| | $P3.P18.\overline{P1.P16}.S3.S18$ | (La + Le) |
| V | $P10.P11.P18.\overline{S20}.S7.S18$ | (La + Lc) shown in FIG. 4 |
| V | $P10.P11.P3.\overline{S0}.S14.S3$ | (Lc + Le) |
| V | $P3.P8.P9.\overline{S0}.S3.S18$ | (Le + Ld) |
| V | $P18.P12.P13.\overline{S20}.S18.S8$ | (La + Lb) |
| V | $\overline{P1}.P2.P3.\overline{P16}.P17.\overline{P9P10}.S2.S17$ | (La + Le) |
| V | $\overline{P1}.P2.\overline{P16}.P18.\overline{P9}.\overline{P10}.S2.S18$ | (La + Le) |
| Third Priority | | |
| | $P18.\overline{S20}.S8.S18.\overline{P16}$ | (La) |
| V | $P3.\overline{S0}.S13.S3.\overline{P1}$ | (Le) shown in FIG. 5 |
| Fifth Priorty (center of Black Point Sequence) | | |
| | $\overline{S0}.S1.(\overline{S21}.S20V\overline{S20}.S19)$ | |
| V | $\overline{S1}.S2.(\overline{S20}.S19V\overline{S19}.S18)$ | |
| V | $\overline{S2}.S3.(S19.S18V\overline{S19}.S17)$ | |
| V | $\overline{S3}.S4.(\overline{S18}.S17V\overline{S17}.S16)$ | |

The indices, attached to the letters "P" and "S" in the term of above table, relates to the stages of the shift registers 8 and 9, according the attachment of the letters "P" and "S" to the registers 8 and 9.

A total of four priorities are formed in which the component center points are used as well as a further fifth priority which evaluates only the contents of the supplemental register 9 and which determines the center of the sequence of black points in this register, i.e., the center of the vertical extent of the character.

The number of centering criteria and that of the priorities may, generally speaking, be different from case to case and depends, inter alia, on the style of the character.

Referring again to FIG. 1, if one of the logic linkage circuits of the evaluation circuit 10 or a plurality of such circuits respond simultaneously, their signals are switched to those outputs of 10 which respectively correspond to the priorities of these signals and are arranged according to their priorities in respective partial memories of a memory circuit 11 which partial memories correspond respectively to respective ones of the five available priorities. The memory circuit 11 is so designed that if a "centered" signal (ONE bit) of a certain priority arrives in its associated partial memory, this partial memory as well as all partial memories associated with lower priorites are set to ONE. A comparing circuit 12, compares each output signal of the evaluation circuit with the corresponding output of the memory circuit in such a way that the condition that an existing centering criterium has a higher priority than those priorities which have been memorized, will be detected.

The comparing circuit 12 is connected to a centering counter 13 which is provided with a pulse input connection 24 which receives the matrix shifting timing pulses ST and whose operation is to be explained below in conjunction with FIG. 6.

Figure 6:
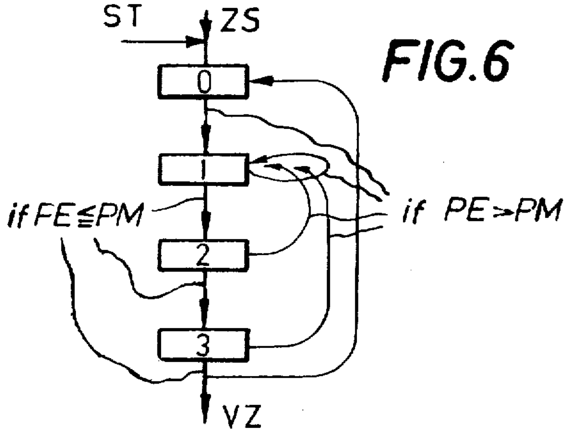
FIG. 6 is a functional diagram illustrating the sequence of the program of the centering counter, shown as a component of the circuit of FIG. 1.

In FIG. 6, four rectangles one above the other represent the four possible positions of the centering counter 13 in this example including its basic position O. The shift timing pulses ST fed to the centering counter 13 step it from one position to another as follows:

A "centered" signal ZS of any priority, which reaches the counter input from the comparing circuit 12 during its basic position 0, starts the centering counter 13 counting. If no "centered" signal of a higher priority appears during this time, the counter passes through positions 1 to 3 at the shift timing rate determined by the pulses ST and when it reaches the third position it produces a vertically centered indication VZ at its output. If a "centered" signal of a higher priority PE>PM appears at the counter input when the counter is in position 1 (binary state 0.1), the last numbers referring to the rank of priority, the counter is stopped. In FIG. 6 this is indicated functionally by a closed directional arrow.

If in the second or third counter position a "centered" signal of an even higher priority PE>PM appears at the input to the centering counter 13, the numbers again identifying only the priorities rank of the signals, the centering counter 13 is returned, depending on its position, to position 1 as indicated functionally by the arrows in FIG. 6 and is immediately restarted. The sequence is repeated if during any one of the following counter steps a "centered" signal of a higher priority appears at the input to the centering counter 13. If this is not the case, the centering counter 13, after having counted to step three, produces a vertically centered indication signal VZ to a conjunction circuit 14 (FIG. 1) and is internally reset to its initial basic position 0.

Figure 7:
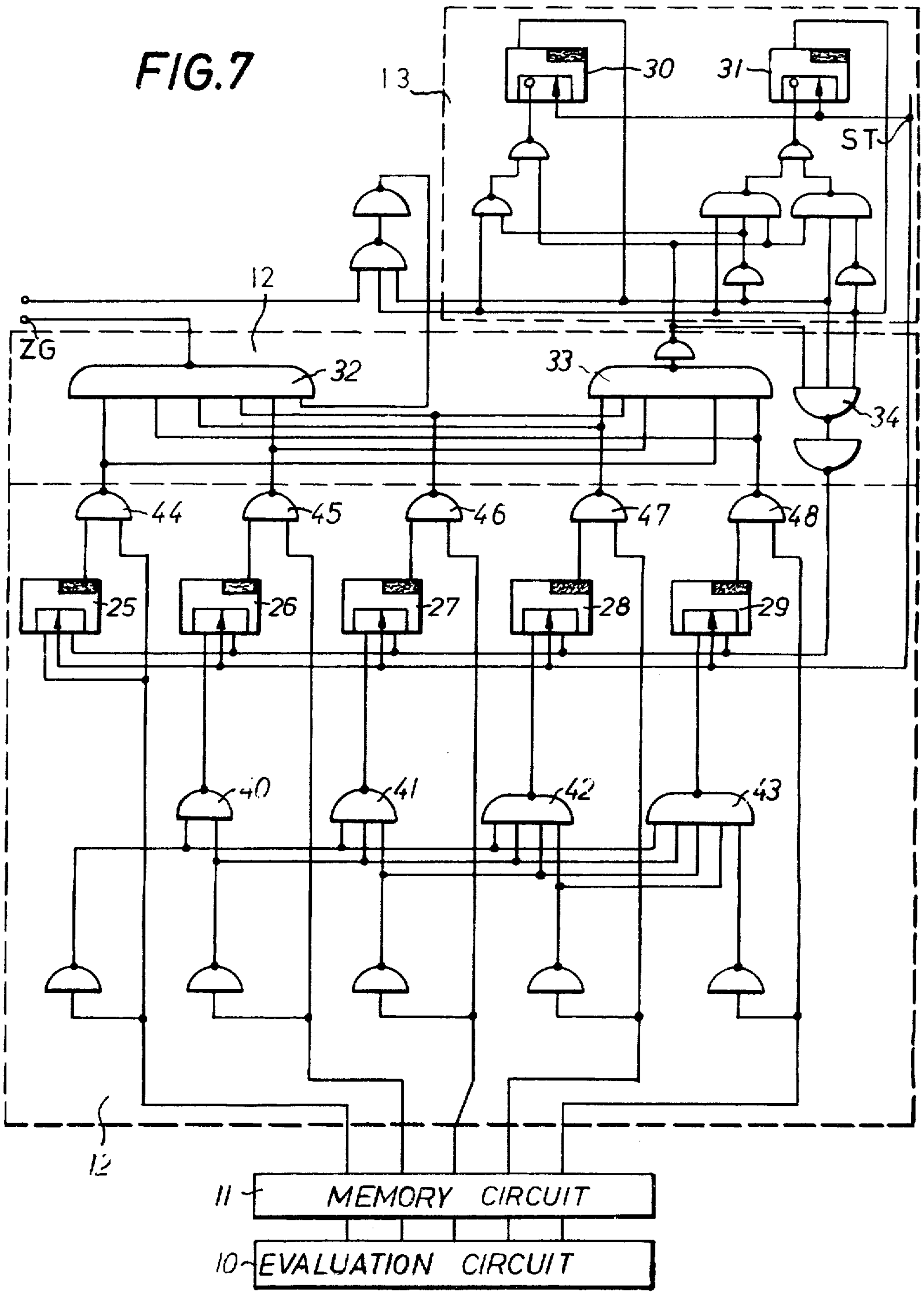
FIG. 7 is a detailed partially schematic diagram of the switching circuit, memory circuit and the centering counter, shown as components of the circuit of FIG. 1.

FIG. 7 shows details of the comparing circuit 12, and its connections with the memory circuit 11 and the centering counter 13. The connections are shown in somewhat more detail, but the principal of operation remains the same. The circuits of FIG. 7 are constituted exclusively by AND circuits having negated outputs, inverters, and flipflops 25, 26, 27, 28, 29, 30 and 31. The operation of the circuit can be directly deducted from the illustration. The flipflops 25–31 are connected via their negated outputs.

If a centering criterion is fullfilled, a logical ONE-level is received at one of the five outputs of the evaluating circuit 10. It is possible, that a ONE- level is received simultantous at all the five outputs or at some of them. Each of these logical ONE- levels will cause a corresponding stage of the memory circuit 12 as well as those stages of lower priority to go in the logical NULL- state with the next pulse in case these have not been set to that state previously. This effect is obtained with the disjunctive linkages 40 up to 43.

If during the pulse period in which a "priority signal" is in the logical ONE- level, the memory circuit stage corresponding to this priority signal hat not been brought out of its basic condition (as a result of a previously fullfilled centering criterion) a logical NULL level is received at the output of that NAND- linkage of the group of linkages 44 up to 48, which corresponds to the activated priority being considered.

This logical NULL- level causes the centering counter 13 via the disjunctive linkage 33 to jump into the binary state ONE at the end of the above mentioned pulse period, regardless of the state in which the counter was in. The effect of the above described circuitry is that any centering criterion being fullfilled will cause the centering counter to start counting, if it is in the basic state (binary NULL) and that any subsequently fullfilled centering criterium of higher priority, than those that have been memorized will result in a return to, or a maintenance of, the binary ONE state for the following pulse period.

The centering counter 13 is a binary counter which, when started, and not being reset to binary ONE, continues to count from 1 to 2 to 3 to NULL with each pulse. On returning to the basic state, the counter can only be restarted with a new centering criterion being fullfilled.

A centering report GZ will come about by fullfillment of the disjunctive linkage 32. This will be the case when the centering counter 13 has the binary state THREE, no priority improvement is being reported from the linkages 44 up to 48 and the horizontal centered position of the character is being reported with signal HZ. With the fullfillment of all those conditions for GZ, appart from HZ, all memory stages are brought into the basic state by means of the conjunctive linkage 34 with the next pulse ST.

If in FIG. 1 a horizontally centered indication signal HZ, whose creation will not be discussed here in detail, is also present at the conjunction circuit 14, the appearance of a vertically centered indication signal VZ at the conjunction circuit 14 results in a totally centered indication signal GZ, which effects transfer of the character stored in the matrix 1 into a character evaluation matrix 18 of conventional construction.

The described organization of the centering counter 13 provides that this transfer always occurs with the same delay after the occurrence of the "best" "centered" signal.

While the details of a circuit for developing the horizontal centering signal Hz is not disclosed, it is to be appreciated that any number of known conventional circuits could be used as well as a circuit arrangement corresponding to the circuit arrangement disclosed herein for developing the vertical centering signal VZ.

Hereafter supplements are usefull to the above described logic linkage circuit 2 as well as to the evaluation circuits 5 and 10.

Figure 8:
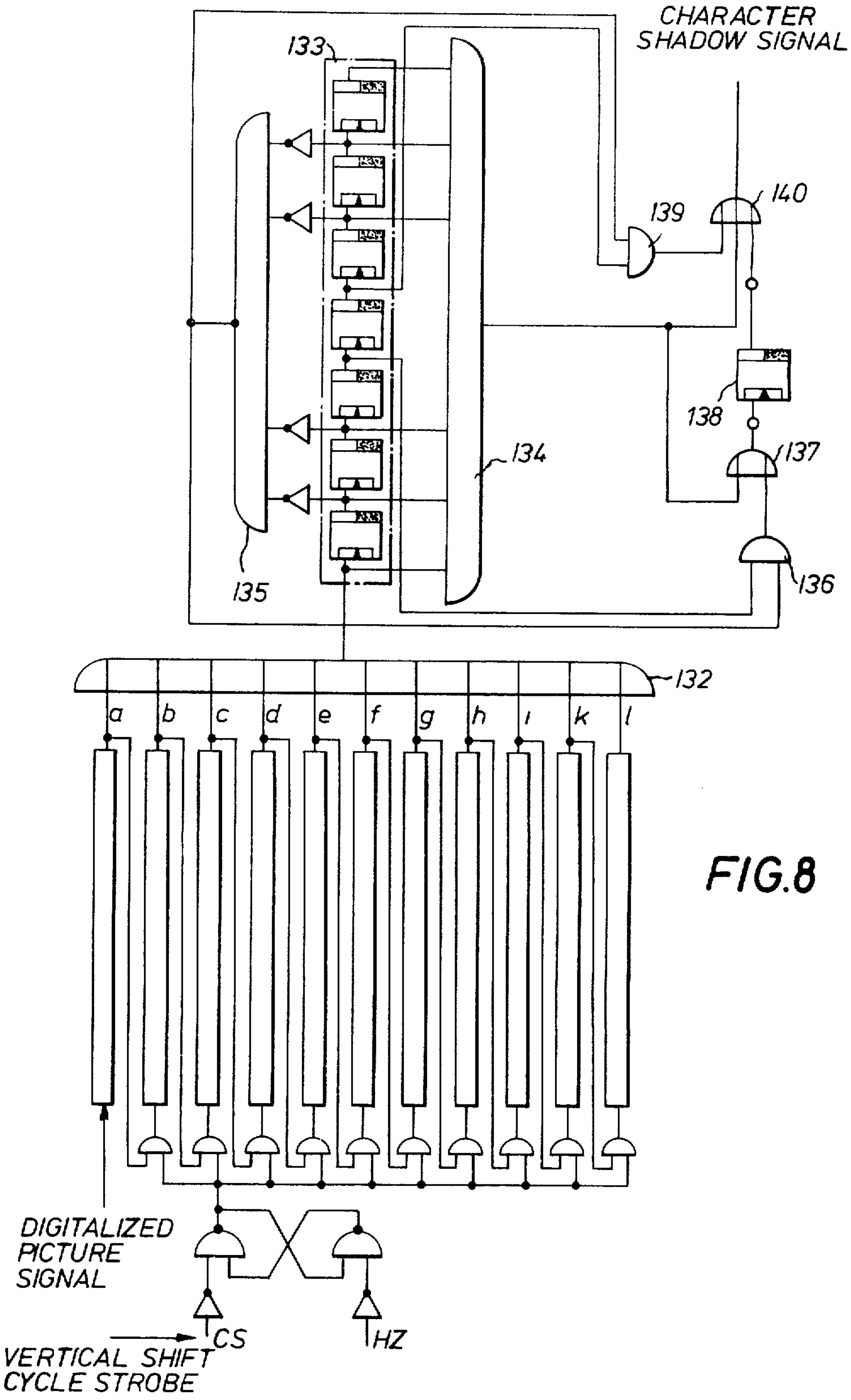
FIG. 8 is a detailed partially schematic diagram of the logic linkage circuits 2 shown as components of the block diagram of FIG. 1.

FIG. 8 shows particulars of the linkage circuit 2 and the matrix 1. The partial matrix field is not shown in this Figure. A disjunctive linkage 132 is connected with its inputs to the taps "*a*" up to "1" of matrix 1. The result of linkage is transmitted to a shift memory 133 containing seven Flip-Flops of conventional type "D". Logic linkages 134, 135 are connected to the stages (Flip-Flop) of that shift memory 133. The outputs of the logic linkages 134, 135 are connected over gates 136 up to 139 to a disjunctive linkage 140.

The function of this linkage circuit 2 is: A binary disjunction of all signals of one row of the matrix 1 formed through the linkage 132 is fed to the input of the shift memory 133. The conjunctive linkage 134 serves the purpose of closing gaps of up to two rows in the character "shadow" signal (signal which would represent the shadow of a character against a screen), while the conjunctive linkage 135 erases vertical extensions of up to two rows if sufficient white above and below these rows, indicate, that these rows are not a part of the character. All Flip-Flops have the same shift pulse as the matrix 1.

Figure 9:
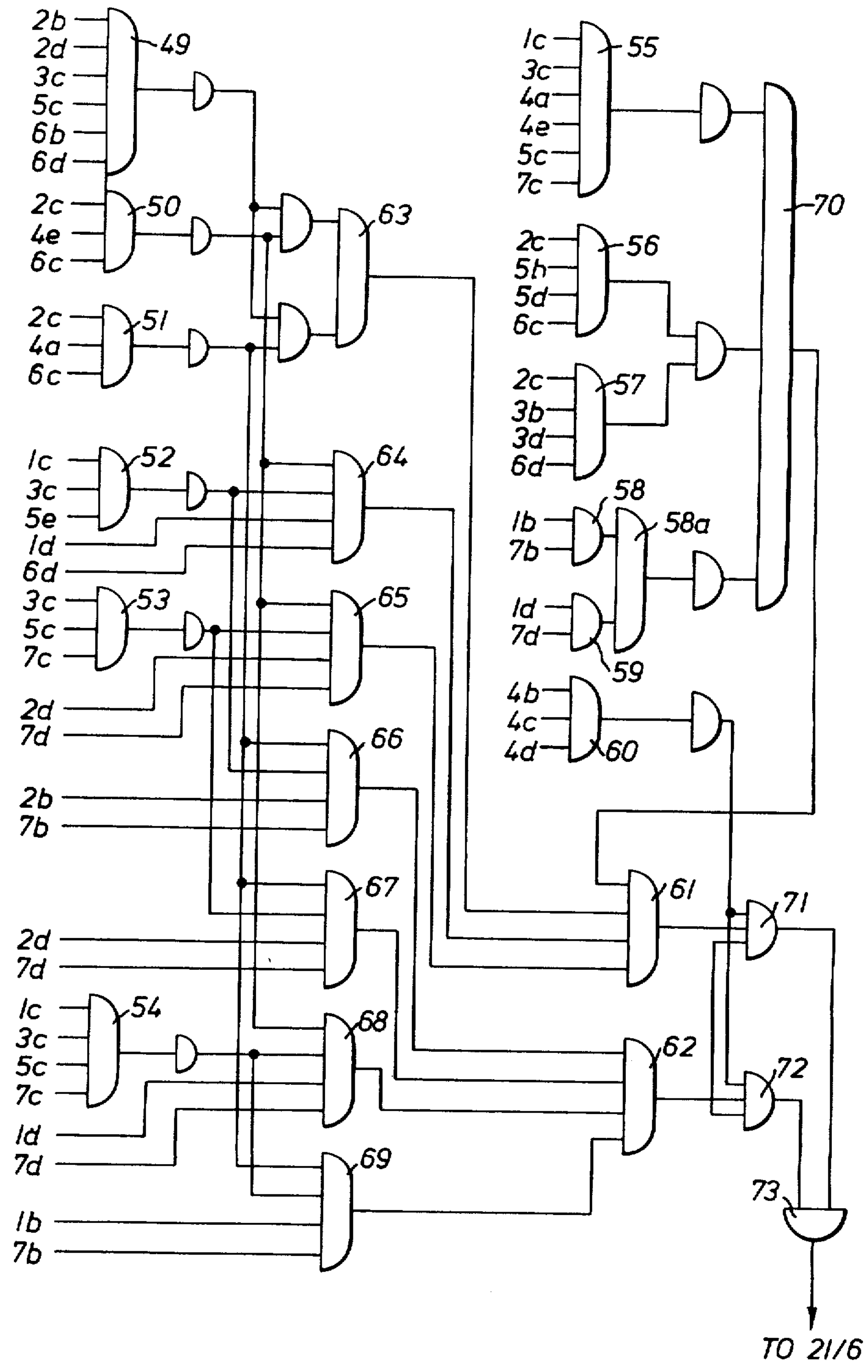
FIG. 9 is a detailed partially schematic diagram of the evaluating circuit 5 shown as components of the block diagram of FIG. 1.

The evaluation circuit 5 is shown in detail in FIG. 9. It contains logic linkage circuits 49 up to 70 and a number of gates, as shown, not bearing reference numerals. The function of that circuit is generally known. For this invention the stages of the partial matrix field 3 shown in FIG. 1 all are connected with the circuit 5 by means of the connections 1*a* up to 7*e*, which are indicated at the inputs to the logic linkages 49 up to 60. The results are converted and in the sequel logically connected with the values in stages of the partial matrix field 3 stages in that succession, by which the numbers are written at the inputs of the logical linkages as shown in FIG. 9. The results of that logical connection circuit are partially connected to the values being in the stages of the partial matrix field 3 as written at the concerning inputs, partially they are connected to the logic linkage circuit 63 up to 70 as shown in FIG. 9. Last all outputs of the linkage circuits 63 up to 70 are connected with the logic linkages 61, 62. The outputs of that linkages are connected to a group of logic linkages 71 up to 73 from where the ascertained component center points are transmitted by the gates 19 up to 23 and 6 to the gate shown in FIG. 1.

Figure 10:
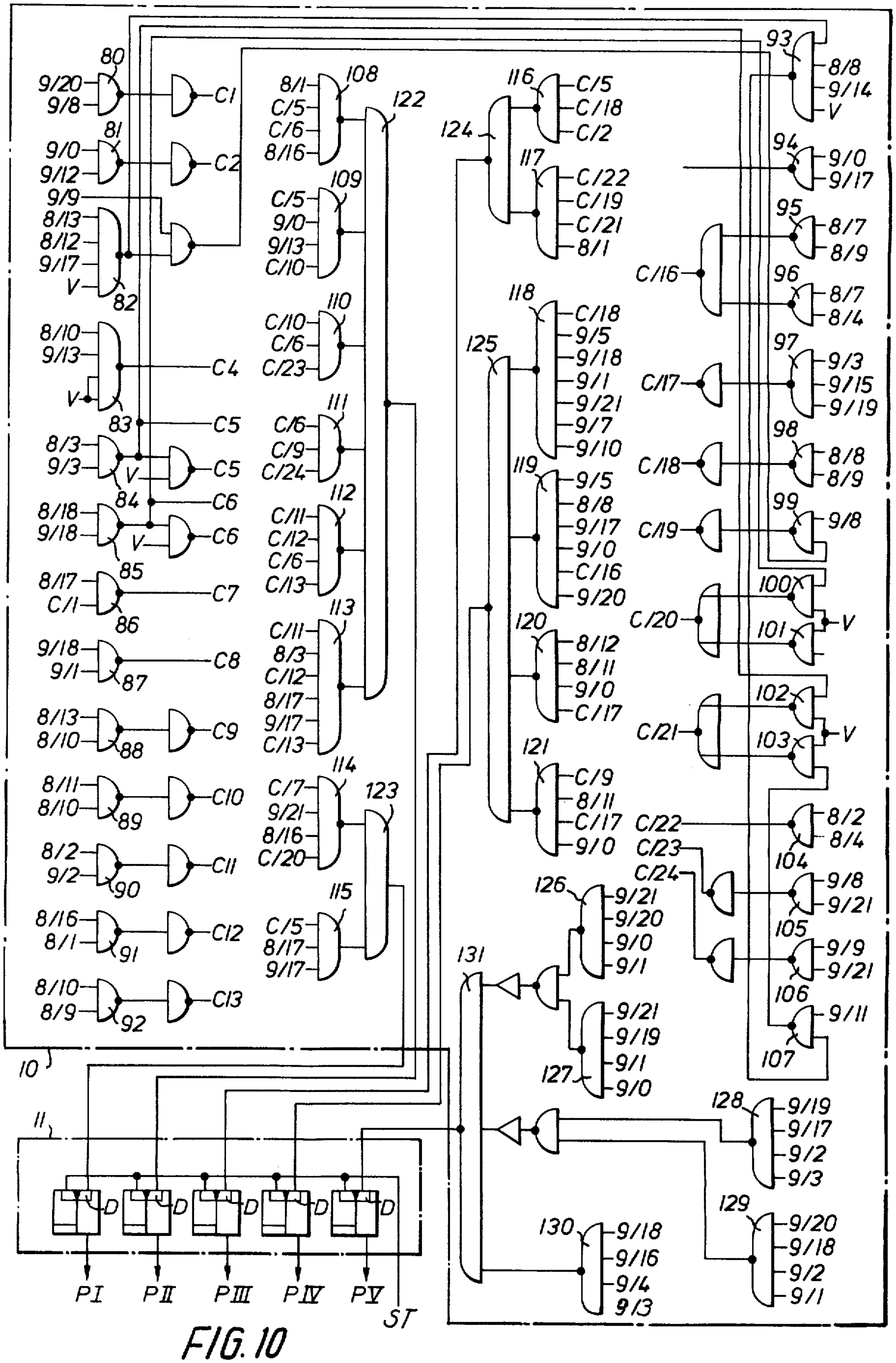
FIG. 10 is a detailed partially schematic diagram of the evaluating circuit 10 shown as components of the block diagram of FIG. 1.

FIG. 10 shows, in order to provide a better comprehension, evaluation circuit 10 of FIG. 1. It contains a number of logic linkages 80 up to 107. The inputs of this linkages are attached to the stages of the shift registers 8, 9, according to the reference numerals at their inputs, corresponding to the numbers of the stages of shift registers 8, 9 shown in FIG. 4 and FIG. 5.

For example the number 9/20 written at the input of the linkage 80 means a connection to that input from the stage 20 of the shift register 9 shown at FIG. 4 or FIG. 5. Relative to the linkage 82 the number 8/13 means the connection to that input from the stage 13 of the shift register 8 shown at FIG. 4 or FIG. 5. To the outputs of that logic linkages 80 up to 107 further logic linkages 108 up to 121 are connected, which transmits the logic results to last logic linkages 122 up to 125, which select four priorities out of all center points represented by ONE- bits in the shift register 8 as well as 9 to the memory circuit 11.

Separated linkages 126 up to 130 are specially connected with their inputs only to the stages of the shift register 9. Their outputs are connected to a last logic linkage 131, which select points of the above mentioned row of black points and transmits them as a fifth priority to the memory circuit 11.

Relative to the HZ signal it is finally in order to mention, that it can be produced by means of switching circuits according to the U.S. Pat. to Gillmann and Hauff No. 3,559,169.

It will be understood that the above description of the present invention is susceptible to various modifications, changes and adaptations, and the same are intended to be comprehended within the meaning and range of equivalents of the appended claims.

We claim:

1. In a method of centering a character, in a character recognition apparatus containing means providing electrical signals constituting a matrix representation of components and background of such character, the centering being in a selected centering direction and relative to a selected ppoint corresponding to a given matrix element, the improvement comprising: evaluating the electrical signals corresponding to at least a portion of such matrix to provide output signals identifying the location in such matrix portion of points substantially on the center line of a character component which extends transversely to such centering direction; and processing such output signals for forming centering criteria indicative of the location of such center line relative to such selected point along such selected centering direction for proper centering of the character, wherein said step of processing comprises developing signals representing centering criteria of different priorities from such output ssignals, and using the signal representing the centering criterion of highest priority during scanning of a character to effect centering of the character.

2. In apparatus in which a character to be recognized, as well as its background, is resolved into raster points and passed through a matrix which is formed by at least one shift register, the improvement comprising a centering system for centering the character in a given centering direction and including: evaluation circuit means coupled to the matrix for recognizing, and producing signals identifying, raster points substantially on the center lines of character components which extend perpendicular to such given centering direction; and register means including a plurality of stages (memory cells) for circulating a marking bit in step with the character shifting in the centering direction, and means coupled from and responsive to signals from said evaluation circuit means for entering such a marking bit into said register means when a minimum number of component center points, particularly two adjacent component center points, have been recognized as lying on a straight line which is perpendicular to the centering direction.

3. A circuit arrangement as defined in claim 2 wherein said register means includes a first register having an output and an input, and in which a ONE bit is entered from said evaluation circuit means every time a component center point has been recognized, the ONE bit being shifted in said first register in synchronism with the matrix shifting; and wherein said register means further includes a second register having an input and an output and the same number of stages (storage cells) as said first register, said input and said output of said second register being coupled together, this input also being coupled to said output of said first register, and in which a bit after being written in is shifted in synchronsim with the matrix shifting, a ONE bit being written into said second register from said evaluation circuit means when a component center point has been determined which is associated with the position of a ONE bit in said first register; and wherein said input and said output of said first register are coupled via a controllable AND gate.

4. A circuit as defined in claim 2 further comprising linkage circuit means coupled to said matrix for determining the height of the character and a supplemental register in which the height (expanse) of the character in the centering direction is reproduced, said supplemental register being coupled to said linkage circuit means and being responsive to signals therefrom.

5. A circuit arrangement as defined in claim 4 wherein said linkage circuit means is a disjunctive linkage circuit for forming a sequence of black-indicating bits from raster points of a row (column) of said matrix, which sequence of bits is coupled to said supplemental register and circulates in said supplemental register in synchronism with the position of the character said matrix.

6. A circuit arrangement as defined in claim 4 further comprising second evaluation circuit means including logic linkage circuits connected to said register means and to said supplemental register and responsive to signals therefrom indicating component center points and/or character height stored respectively in said register means and said supplemental register for disjunctively combining them into groups to form "centered signals" of different priorities.

7. A circuit arrangement as defined in claim 6 including switching circuit means coupled to said second evaluation circuit means and responsive to the "centered signals" therefrom for indicating the highest priority of at least one of the "centered signals" in response to the receipt of a plurality of such signals from said second evaluation circuit means.

8. A circuit as defined in claim 7 further comprising a memory circuit coupled to said switching circuit means and responsive to "centered signals" therefrom for storing a succession of "centered signals," said memory circuit including means for erasing a stored "centered signal" and for storing instead a "centered signal" having a higher priority as soon as such a signal appears.

9. A circuit arrangement as defined in claim 8 further comprising a centering counter coupled to said memory circuit and responsive to the "centered signals" therefrom as well as to shift timing pulses for bringing it into a counting position by a "centered signal" or by a subsequent "centered signal" of a higher priority, from which counting position it continues counting whenever no "centered signals" having higher priorities appear until it reaches a maximum whereupon it produces a "centered"indication and resets to its rest position.

* * * * *